Patented Oct. 10, 1944

2,360,150

UNITED STATES PATENT OFFICE 2,360,150

PROCESSING SYNTHETIC RUBBER

Frederick J. Myers, Philadelphia, Pa., assignor to The Resinous Products & Chemical Company, Philadelphia, Pa.

No Drawing. Application July 5, 1941,
Serial No. 401,271

10 Claims. (Cl. 260—42)

This invention deals with the processing of rubber-like polymers based on diolefins. It relates to the rubbery, resin-like composition obtained from the compounding of rubber-like diolefinic polymers and the infusible, heat-converted, relatively insoluble reaction products from mixing and heating together a solvent-soluble carbamide-aldehyde-alcohol condensate and a non-drying oil-modified alkyd resin.

The polymerization of a butadiene compound, such as butadiene itself, methyl or dimethyl butadiene, chlorobutadiene, or similar doubly unsaturated compound, particularly in the presence of another unsaturated, polymerizable organic compound, such as styrene, acrylonitrile, an acrylic or methacrylic ester, or chloroacrylonitrile, yields a rubber-like product which has considerable utility but which also has various undesirable properties, such as dryness, hardness, "leatheriness," resistance to working on the rubber mill, etc. It is desirable to correct such difficulties and to adapt the "synthetic rubbers" to many uses of natural rubber and to many new applications with retention of the most favorable properties of the synthetic rubbers, including resistance to swelling in most organic solvents, toughness, resistance to abrasion, etc.

It has been found that compositions lacking the above-enumerated undesirable properties and possessing many unique properties are obtained by mixing a rubber-like diolefinic polymer or synthetic rubber with the reaction product obtained by mechanically working and simultaneously heating a solvent-soluble carbamide-aldehyde-alcohol condensate and a non-drying oil-modified alkyd resin until the resulting product is essentially insoluble in organic solvents. The mixture is softer than the unmodified polymer, is less leathery, has less "nerve," and is more readily compounded with sulfur, accelerators, fillers, pigments, etc. In particular, the addition of the resinous reaction product to synthetic rubber improves markedly the dispersion of pigments. This is especially valuable in the case of carbon blacks. The dispersing action decreases milling time and yields a more homogeneous product. The compounded material is, particularly suitable for handling and lends itself to extruding, sheeting, and the like. The compounded mixture may be vulcanized according to conventional methods. The vulcanized stock is as highly resistant to organic solvents as the unmodified stock. Variation in properties results from varying the proportions of synthetic rubber to the said infusible, insoluble reaction product and from the particular reaction product used. These variations in proportion and composition of the reaction product permit the adaptation of the mixture to many applications.

The reaction product referred to is prepared from a carbamide-aldehyde-alcohol condensate and a non-drying oil-modified alkyd resin by mechanically working these two materials together and simultanaeously heating the mixture between about 120° C. and about 180° C. until a homogeneous, infusible, essentially insoluble product results. As a carbamide-aldehyde-alcohol condensate there may be used the reaction products of a carbamide, such as urea or thiourea, an amino-1,3,5-triazine, such as melamine or thioammeline, or mixtures of such materials, an aldehyde, such as formaldehyde, and any alcohol, such as butyl or octyl alcohol, to give a solvent-soluble condensate with the carbamide and aldehyde. Such condensates are well known and are available commercially. The condensates are often prepared as a solution with an excess of the alcohol used, such as ethanol, butanol, capryl alcohol, etc. Higher alcohols may be used in the preparation of the condensate when so desired and are generally reacted with the condensates from lower alcohols by alcoholysis.

The non-drying oil-modified alkyd resins are prepared from non-oxidizing fatty acids or their corresponding glycerides, such as lauric, myristic, stearic, oleic, ricinoleic, or other fatty acid, or cocoanut oil, cottonseed oil, castor oil, etc., polyhydric alcohols such as glycerol, glycol, polyethylene glycol, sorbitol, and the like or mixtures thereof, and polybasic acids, such as phthalic, maleic, succinic, adipic, pimelic, sebacic, citric, etc., or mixtures thereof. A small amount of a drying oil may also be incorporated without imparting drying properties to the alkyd resin. Further details concerning the preparation of the alkyd resins, the carbamide-aldehyde-alcohol condensates, and the reaction product of the condensate with the non-drying oil-modified alkyd resin are given in application Serial No. 287,698, filed August 1, 1939, which, on August 18, 1942, issued as United States Patent 2,293,164, in which are claimed the novel products resulting from simultaneously heating and working together said condensate and said alkyd resin. Suitable reaction products may be prepared with one part of condensate to one to twenty parts of the alkyd resin.

The reaction product of a carbamide-aldehyde-alcohol condensate and an alkyd resin is preferably mixed with the synthetic rubber polymer on a rubber mill. A homogeneous stock is soon obtained, the reaction product serving to peptize or plasticize the rubbery polymer. The compounding ingredients are then incorporated with increased ease and thoroughness. Toughness and "nerve" are lessened.

These effects are evident with the presence of as little as five parts of the reaction product of carbamide-aldehyde-alcohol condensate and alkyd resin to 95 parts of synthetic rubber polymer. With 25 parts or more of the reaction product to 75 parts or less of the polymer there is an increase in tack and a low "nerve." This type of stock is particularly useful for extruding, coating of wires and cables, sheeting, etc., holding dimensions better than a more lively stock. With still higher ratios of the reaction product to synthetic rubber polymer the composition is useful for the coating of fabrics, for the preparation of mechanical goods, such as gaskets, printers' rolls, etc. While there is no sharp upper limit of reaction product to rubbery polymer, a practical limit is approximately 80 parts of reaction product to 20 parts of rubber-like polymer, since this proportion of rubber-polymer is necessary to impart the strength required in the usual applications. For special applications wherein this strength is not required, still higher proportions may be used.

The following examples are typical of the compositions which may be prepared according to this invention.

Example 1

An alkyd resin was prepared by heating together 50 parts of phthalic anhydride, 50 parts of the by-product acids resulting from the preparation of sebacic acid from castor oil, 55 parts of diethylene glycol and 34 parts of glycerine until a highly viscous homogeneous product resulted. 1320 parts of this product was placed in a Werner-Pfleiderer mixer and warmed. There was then added to the mixer 264 parts of a butanol solution containing 50% of a urea-formaldehyde-butyl alcohol condensate. The mixture was worked and heated at 130° C. for about two hours to yield a tough, rubbery, insoluble material which was compatible with the rubbery polymeric product obtained from butadiene and acrylonitrile with the polymeric product from butadiene and styrene and with the polymeric product known as "Butyl" rubber, which is a copolymer of isobutylene with a small amount of a diolefin, sufficient to impart enough unsaturation to permit vulcanization. The addition of the reaction product to these synthetic rubbers produced a definite softening and permitted more complete compounding.

Example 2

An alkyd resin was prepared from 66 parts of sebacic acid, 66 parts of phthalic acid, 50 parts of glycerine, and 140 parts of castor oil by heating the mixture first at 100°–120° C. for an hour and then at 200° C. until the acid number reached 35. 1320 parts of this alkyd resin and 390 parts of a condensate of urea, melamine, formaldehyde and butyl alcohol were mixed and heated at about 120 C. until a homogeneous product resulted.

A mixture of 10 parts of this product and 90 parts of the synthetic rubber polymer from butadiene and acrylonitrile was made on a rubber mill. The mixture was softer than the original polymer and homogeneous. Sulfur, pigments, accelerators, and reenforcing agents were readily incorporated and the stock cured in the conventional manner.

Example 3

100 parts of the alkyd, prepared as in Example 1, was mechanically worked in a Werner-Pfleiderer mixer with seven parts of a urea-formaldehyde-butyl alcohol condensate in seven parts of butyl alcohol. The mixture was heated at 135° C. for about two hours to give a soft, resilient material of limited thermoplasticity. This material was mixed with so-called "Perbunan" rubber in the following ratios: 1:2, 1:1, 2:1, and 3:1 to give homogeneous stocks. The resinous reaction product and synthetic rubber exhibited excellent compatibility and were combined without difficulty. The mixtures were then compounded in the conventional manner, of which the following formulation is typical:

| | Parts |
|---|---|
| Perbunan | 150 |
| Alkyd-condensate reaction product | 150 |
| Stearic acid | 3 |
| Paraffin | 2.3 |
| Zinc oxide | 7.5 |
| Sulfur | 2.7 |
| Carbon black, medium reenforcing | 30 |
| Carbon black, "soft black" | 50 |
| Benzothiazyl disulfide | 2 |
| Dibutylamine | 0.3 |

After the Perbunan and reaction product had been milled together the ingredients were added in the order given. The compounded stock was vulcanized at 150° C. for 40 minutes. The product was equal in toughness to a similar unmodified stock, but lacked the resilience of the unmodified stock or Perbunan stock modified with the "elasticator" type of softener. The solvent resistance, tested in hydrocarbon solvents of the aliphatic or aromatic type, was equal or superior to that of unmodified stock. The ageing properties were entirely satisfactory and at least equal to those of the unmodified stock.

Example 4

The reaction product of alkyd resin and urea-formaldehyde-butanol condensate as shown in the previous example was milled with a synthetic rubber of the neoprene type, available as "Type G," in the proportion of 150 parts of reaction product to 150 parts of the neoprene. There was then added to the mixture 30 parts of calcined magnesia and 15 parts of wood rosin, followed by 15 parts of cocoanut oil, 100 parts of titanium dioxide (low oil absorption type), 3 parts of sulfur, and 30 parts of zinc oxide. The resulting stock was cured at 150° C. for 40 minutes. Its oil-resistance was superior to that of unmodified neoprene. Its resilience was decreased, but other properties remained essentially unchanged.

I claim:

1. A process for improving the properties of rubber-like polymers from conjugated diolefins which comprises mixing therewith a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of an aldehyde, a normally liquid alcohol in excess, and at least one member of the group consisting of carbamides and amino-1,3,5-triazines, said condensate being in a form that is soluble in organic solvents.

2. A process for improving the properties of rubber-like polymers from conjugated diolefins which comprises mixing therewith a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of an aldehyde, a normally liquid alcohol in excess, and urea, said condensate being in a form that is soluble in organic solvents.

3. A process for improving the properties of rubbery polymers from butadiene and acrylonitrile which comprises mixing therewith a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of an aldehyde, a normally liquid alcohol in excess, and at least one member of the group consisting of carbamides and amino-1,3,5-triazines, said condensate being in a form that is soluble in organic solvents.

4. A composition of matter comprising an intimate mixture of a rubber-like polymer from a conjugated diolefin with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of an aldehyde, a normally liquid alcohol in excess, and at least one member of the group consisting of carbamides and amino-1,3,5-triazines, said condensate being in a form that is soluble in organic solvents.

5. A composition of matter comprising an intimate mixture of a rubbery polymer from butadiene and acrylonitrile with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of formaldehyde, a normally liquid alcohol in excess, and at least one member from the group consisting of carbamides and amino-1,3,5-triazines, said condensate being in a form that is soluble in organic solvents.

6. A composition of matter comprising an intimate mixture of a rubbery polymer from a conjugated diolefin and styrene with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of formaldehyde, a normally liquid alcohol in excess, and at least one member of the group consisting of carbamides and amino-1,3,5-triazines, said condensate being in a form that is soluble in organic solvents.

7. A composition of matter comprising an intimate mixture of a rubbery polymer from a conjugated diolefin with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of formaldehyde, a normally liquid alcohol in excess, and a carbamide, said condensate being in a form that is soluble in organic solvents.

8. A composition of matter comprising an intimate mixture of a rubbery polymer from a conjugated diolefin with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of formaldehyde, a normally liquid alcohol in excess, and an amino-1,3,5-triazine, said condensate being in a form that is soluble in organic solvents.

9. A composition of matter comprising an intimate mixture of a rubbery polymer from a conjugated diolefin with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of formaldehyde, a normally liquid alcohol in excess, and urea, said condensate being in a form that is soluble in organic solvents.

10. A composition of matter comprising an intimate mixture of a rubbery polymer from a conjugated diolefin with a material which results from mechanically working and simultaneously heating together at temperatures between about 120° C. and about 180° C., until a homogeneous, relatively infusible, flexible reaction product which is essentially insoluble in organic solvents is formed, an oil-modified non-drying alkyd resin and a condensate of formaldehyde, a normally liquid alcohol in excess, and melamine, said condensate being in a form that is soluble in organic solvents.

FREDERICK J. MYERS.